3,702,865
ETHYL 2-METHYL-2-n-PROPYLAMINO-PROPYL SUCCINATE

Julian R. Reasenberg, Brooklyn, and Rubin Drucker, Rosedale, N.Y., assignors to Mizzy Inc., New York, N.Y.
No Drawing. Application Apr. 22, 1970, Ser. No. 28,295, which is a continuation of application Ser. No. 848,394, July 23, 1969, which in turn is a continuation of application Ser. No. 379,375, June 30, 1964. Divided and this application Jan. 27, 1971, Ser. No. 110,300
Int. Cl. C07c 69/40
U.S. Cl. 260—485 J          1 Claim

ABSTRACT OF THE DISCLOSURE 1-ethyl - 4 - (2 - methyl-2-n-propylamino-propyl)-succinate useful as a local anesthetic.

RELATED APPLICATIONS

This application is a division of application Ser. No. 28,295, filed Apr. 22, 1970, now abandoned, which is in turn a continuation of Ser. No. 848,394, filed July 23, 1969, now abandoned, which is in turn a continuation of Ser. No. 379,375, filed June 30, 1964, now abandoned.

BACKGROUND

The present invention relates to novel pharmaceutical compounds of the type known as local anesthetics and more particularly, the invention relates to novel pharmaceutical compounds of the type known as benzocaines.

It has been found that many compounds of this type cannot be used clinically either because of their inferior anesthetic action or because of their toxicity.

Thus, an object of the invention is to provide novel chemical compounds possessing valuable pharmacological properties.

Another object of the invention is to provide novel chemical compounds possessing local anesthetic activity A further object of the invention is to provide novel chemical compounds which possess superior local anesthetic activity to and lower toxicity than previous compounds.

Still a further object of the invention is to provide novel chemical compounds possessing superior local anesthetic properties, which upon injection, provide a superior local anesthetizing effect but which effect is of shorter duration than that of the prior compounds.

With the above, and other objects in view which will hereinafter appear as the specification proceeds, the invention consists of chemical compounds and methods of using them pharmacologically all as hereinafter more particularly described and illustrated.

SUMMARY 1-ethyl - 4 - (2 - methyl-2-n-propylamino-propyl)-succinate having the formula

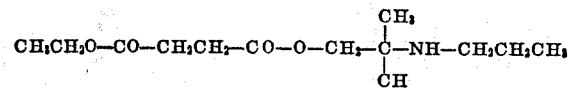

DESCRIPTION

The organic bases of the invention form salts which are non-toxic in therapeutic dosage with a variety of inorganic and strong organic acids including sulfuric, phosphoric, hydrochloric, hydrobromic, sulfamic, citric, lactic, maleic, malic, succinic, tartaric, cinnamic, acetic, benzoic, gluconic, and related acids.

The compounds of this invention can be prepared by reacting an amino alcohol with a carboxylic acid as for instance with an aromatic carboxylic acid to form the corresponding ester. The reaction takes place over a broad range of temperatures with or without pressure, if desired, in the presence of an organic solvent. It is not necessary that the solvent be present, however. The further working up of the product of the reaction takes place in any convenient way and may, for example, be carried out by dissolving the crude reaction product in an acid, filtering off any undissolved material and precipitating the desired compound by, for example, addition of alkali. Further purification can be achieved by repeated recrystallization from a suitable solvent, as for example, from alcohol, or of the hydrochloride, or other soluble salt from water or isopropyl alcohol.

The compounds in accordance with the invention as set out above can be converted into and reconverted from any desired salts thereof in any convenient way.

It has been noted that the compounds within the formulae above set out are of the benzocain type. Nevertheless, although the compounds of the invention possess local anesthetic properties, they possess a further property not possessed by any of the local anesthetics, namely a shortened duration of anesthetizing effect upon injection. The exact reason for this is not fully understood. However, in the light of tests between known compounds, as for example procaine, on the one hand, and the compounds of the invention on the other hand, it would appear that the relatively rapid loss of the effect after injection of the compounds in accordance with the invention is due to hydrolysis of the ester group in the presence of enzymes. The compound of the present invention appears to offer little resistance to hydrolysis and this is believed to be due to the absence of any steric hindering effects in the molecule. At any rate it has been found that the compounds of the invention have, in addition to a much faster rate of hydrolysis, a substantially deeper anesthetizing effect as compared to the known compounds. For example, equi-anesthetic solutions of the compounds produce in comparison with the common clinically employed benzocaines, several times the anesthetic effect but that of much shorter duration. The rate and degree of hydrolysis varies directly with the nature and position of the substituents in the molecule.

The compounds in accordance with the invention have also been demonstrated to possess in addition to increased potency less toxicity than the known compounds. The compounds have been found to be less irritating than the conventional alkyl-amino-alkyl benzoates in tests. Among the tests carried out were comparative pharmacological tests involving the injection intraperitoneally (intestinal cavity) of the free base or salt in accordance with the invention. The test procedure involved determining the weight in milligrams of the compound subjected to test per kilogram of body weight of the animals (white mice) required to kill 50% of the animals. The greater the weight of the compound required to give 50% mortality, the less toxic the compound. It was found in these tests that up to about 250% more of the compounds in accordance with the invention could be administered before the same degree of toxicity was encountered as in the case of the known alkylamino benzoates relative to procaine.

Tests on the rate of metabolism in human blood serum indicate the compound of the invention is hydrolyzed up to about 67 times more rapidly than the known compounds. In the lower animals this difference in rate of hydrolysis is much less. Hence, the relative toxicity of the compound of this invention, compared to the known compounds, in humans, is even less than the above-noted toxicity studies on the lower animals indicate.

Comparative pharmacological tests were carried out involving the injection intracutaneously of a 2% aqueous solution of the base and the salt of the compounds in accordance with the invention in animals (rats). The animals were inspected immediately after injection to determine whether the skin showed signs of irritation. These tests showed no irritation for the compounds of the invention whereas the known compounds produced signs of irritation that were clearly evident on the animals' skin relative to procaine.

In order to evaluate the potency of the compounds, equivalent doses of the known compounds and of the compounds in accordance with the invention were injected in the sciatic nerve of rats and the time required for onset of anesthesia and duration of the anesthesia recorded. A survey of the results showed that three-quarters of the dose of the known compounds of a compound in accordance with the invention was capable of bringing about the onset of rapid anesthesia, the onset taking place in one-half the time required for the known compound and that the duration of the anesthesia was much less than that observed for the known compounds.

From the above it will be noted that the anesthetic potency of the compound of this invention is considerably greater than that of the known compounds while its toxicity is much less. Furthermore, the compounds of the invention are materially less irritating than the known compounds.

Moreover, the compounds in accordance with the invention are extremely stable, may be sterilized by heat without decomposition, and are resistant to oxidation.

EXAMPLE 1

1-ethyl-4-(2-methyl-2-n-propylamino-propyl)-succinate hydrochloride 25.2 g. 2-methyl-2-n-propylamino-propanol hydrochloride, 100 cc. chloroform and 28.9 g. ethyl succinoyl chloride were mixed and refluxed for about 6½ hours. The base in the form of its hydrochloride was precipitated by addition of di-isopropyl ether and extracted with water. Ammonium hydroxide solution was added and the free base extracted with di-ethyl ether, dried over anhydrous sodium sulfate, and the solvent evaporated off. About 30 g. of the crude base were obtained as a yellow oil. The formula of the base is:

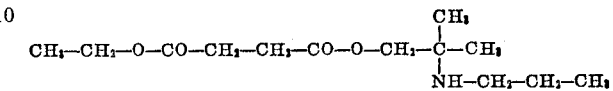

and its molecular weight is 259.3.

The hydrochloride was prepared by dissolving the base in di-isopropyl ether and adding alcoholic hydrochloric acid. It was recrystallized from a mixture of toluene and di-isopropyl ether to yield about 30 g. of white crystals having a melting-point of 71–72° C. The empirical formula of the hydrochloride is $C_{13}H_{26}NO_4Cl$ and its molecular weight is 295.8.

Calculated (percent): Cl, 12.01. Found (percent): Cl, 12.23.

What is claimed is:

1. 1-ethyl - 4 - (2-methyl-2-n-propylamino-propyl)-succinate.

References Cited

UNITED STATES PATENTS 3,497,550   2/1970   Lamour _____ 260—485 J

LORRAINE A. WEINBERGER, Primary Examiner

E. J. SKELLY, Assistant Examiner

U.S. Cl. X.R.

424—313